(12) United States Patent
Doan et al.

(10) Patent No.: US 10,359,025 B2
(45) Date of Patent: Jul. 23, 2019

(54) METHOD FOR CONTROLLED SHUTDOWN OF WIND POWER FACILITY

(71) Applicant: VESTAS WIND SYSTEMS A/S, Aarhus N (DK)

(72) Inventors: Duy Duc Doan, Tilst (DK); John Godsk Nielsen, Hornslet (DK); Per Bisgaard, Højbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 4 days.

(21) Appl. No.: 15/326,801

(22) PCT Filed: Jul. 2, 2015

(86) PCT No.: PCT/DK2015/050202
§ 371 (c)(1),
(2) Date: Jan. 17, 2017

(87) PCT Pub. No.: WO2016/008492
PCT Pub. Date: Jan. 21, 2016

(65) Prior Publication Data
US 2017/0211546 A1     Jul. 27, 2017

(30) Foreign Application Priority Data

Jul. 17, 2014  (DK) .................................. 2014 70454

(51) Int. Cl.
*F03D 7/02*     (2006.01)
*F03D 9/25*     (2016.01)
(Continued)

(52) U.S. Cl.
CPC .......... *F03D 7/0264* (2013.01); *F03D 7/0272* (2013.01); *F03D 9/255* (2017.02);
(Continued)

(58) Field of Classification Search
CPC ................. Y02E 10/723; Y02E 10/725; H02P 2009/004; H02P 3/18; H02P 3/22;
(Continued)

(56) References Cited

U.S. PATENT DOCUMENTS 8,742,609 B2   6/2014  Helle et al.
2007/0216166 A1*  9/2007  Schubert ............... F03D 7/0224
                                                              290/55
(Continued)

FOREIGN PATENT DOCUMENTS

EP           1860321 A2    11/2007
WO       2006069569 A1     7/2006
(Continued)

OTHER PUBLICATIONS

International Search Report for PCT/DK2015/050202, dated Sep. 23, 2015.
Danish Search Report for PA 2014 70454, dated Feb. 10, 2015.

*Primary Examiner* — Charles Reid, Jr.
(74) *Attorney, Agent, or Firm* — Patterson + Sheridan, LLP

(57) ABSTRACT

The present invention relates to a method for shutting down a wind power facility, said wind power facility comprising a power generator, a power converter comprising generator side and grid side converters being separated by an intermediate DC circuit, and power dissipation or power storage means being operatively connected to the intermediate DC circuit, the method comprising the steps of determining that the wind power facility needs to be shut down, and operating the generator side converter in accordance with a load time curve during shutdown of the wind power facility in order to avoid overloading of selected generator side converter components and the power dissipation or power storage means.

(Continued)

Moreover, the present invention relates to a wind power facility for performing this method.

16 Claims, 4 Drawing Sheets

(51) Int. Cl.
    *H02P 3/18*      (2006.01)
    *H02P 3/22*      (2006.01)
    *H02P 9/08*      (2006.01)

(52) U.S. Cl.
    CPC ................. *H02P 3/18* (2013.01); *H02P 3/22* (2013.01); *H02P 9/08* (2013.01); *Y02E 10/723* (2013.01); *Y02E 10/725* (2013.01)

(58) Field of Classification Search
    CPC .......... H02P 9/08; F03D 7/0264; F03D 9/255; F03D 7/0272
    USPC .......................................................... 290/44
    See application file for complete search history.

(56) References Cited

U.S. PATENT DOCUMENTS

| | | | | |
|---|---|---|---|---|
| 2009/0183576 A1* | 7/2009 | Honhoff | ................... | F03D 7/02 |
| | | | | 73/861.85 |
| 2011/0089693 A1* | 4/2011 | Nasiri | ................... | F03D 7/0272 |
| | | | | 290/44 |
| 2011/0133458 A1* | 6/2011 | Harrison | ................. | F03D 7/046 |
| | | | | 290/44 |
| 2011/0182712 A1* | 7/2011 | Nayebi | ................... | F03D 7/028 |
| | | | | 415/15 |
| 2012/0101640 A1* | 4/2012 | Stapelfeldt | ........... | F03D 7/0284 |
| | | | | 700/287 |
| 2013/0038059 A1* | 2/2013 | Andresen | ............... | F03D 7/0284 |
| | | | | 290/44 |
| 2013/0101413 A1* | 4/2013 | Esbensen | ............... | F03D 7/0224 |
| | | | | 416/1 |
| 2013/0119912 A1* | 5/2013 | Ayano | ..................... | H02M 1/32 |
| | | | | 318/472 |
| 2013/0293287 A1* | 11/2013 | Zhu | ........................ | H02M 1/08 |
| | | | | 327/538 |
| 2013/0334818 A1 | 12/2013 | Mashal et al. | | |
| 2014/0159367 A1* | 6/2014 | Yin | ........................ | F03D 7/028 |
| | | | | 290/44 |
| 2014/0161610 A1* | 6/2014 | Hess | ..................... | F03D 7/0224 |
| | | | | 416/1 |
| 2014/0203563 A1* | 7/2014 | Bowyer | ................ | F03D 7/0284 |
| | | | | 290/44 |
| 2015/0137518 A1* | 5/2015 | Yin | ....................... | F03D 7/0284 |
| | | | | 290/44 |

FOREIGN PATENT DOCUMENTS

| | | |
|---|---|---|
| WO | 2012134458 A1 | 10/2012 |
| WO | 2013083139 A2 | 6/2013 |
| WO | 2013097867 A2 | 7/2013 |

\* cited by examiner

METHOD FOR CONTROLLED SHUTDOWN OF WIND POWER FACILITY

FIELD OF THE INVENTION

The present invention relates to a method for controlled shutdown of wind power facilities. In particular, the present invention relates to a method which ensures that at least the generator side converter is not overloaded during shutdown.

BACKGROUND OF THE INVENTION

Various dump-load related arrangements for power dissipation/storage have been suggested over the years. Power dissipation/storage typically becomes relevant in case a wind turbine remains operated during for example grid faults.

WO2013/083139 discloses a method for controlled shutdown of wind turbines. The method involves using a generator side converter, and optionally a DC chopper, as a generator load during controlled shutdown.

U.S. Pat. No. 8,742,609 discloses a method for operating a wind power facility during for example a grid fault. The wind power facility of U.S. Pat. No. 8,742,609 comprises a power dissipation/storage arrangement being adapted to dissipate or store electrical energy exceeding an amount to be delivered to an associated power supply grid during a grid fault. The method includes operating the wind power facility in accordance with an allowed amount of electrical energy that can be dissipated or stored in the power dissipation/storage of the wind power facility by ensuring that a total amount of electrical energy generated by the wind power facility does not exceed a sum of the allowed amount that can be dissipated or stored in the power dissipation/storage and the amount to be delivered to the associated power supply grid.

The method suggested in U.S. Pat. 8,742,609 does however not include that at least the primary components, such as the DC-chopper and the insulated-gate bipolar transistors (IGBTs) of the generator side converter, are monitored during shutdown in order to avoid overloading.

DESCRIPTION OF THE INVENTION

It may be seen as an object of embodiments of the present invention to provide a method that ensures that at least the primary components of the generator side converter is not overloaded during shutdown.

The above-mentioned object is complied with by providing, in a first aspect, a method for shutting down a wind power facility, said wind power facility comprising a power generator, a power converter comprising generator side and grid side converters being separated by an intermediate DC circuit, and power dissipation or power storage means, or equipment, being operatively connected to the intermediate DC circuit, the method comprising the steps of
  determining that the wind power facility needs to be shut down, and
  operating the generator side converter in accordance with a load time curve during shutdown of the wind power facility in order to avoid overloading of selected generator side converter components and the power dissipation or power storage means, or equipment.

The term wind power facility is to be understood broadly. Thus, it may cover a single wind turbine, also called wind turbine generator (WTG), or a group of wind turbines forming a wind power plant (WPP).

The selected generator side converter components may include components like the active switches, typically in the form of IGBTs, and/or the associated cooling means of the converter.

The present invention is primarily intended for wind power facilities where all the power generated by the power generator is passed through the power converter including the generator side converter, the grid side converter and the intermediate DC circuit therebetween.

The power generator may be generating AC power at three-phases. This generated AC power is rectified by the generator side converter before being supplied to the intermediate DC circuit which feeds the grid side converter. The grid side converter converts the DC voltage to a three-phase AC voltage having a frequency that matches the grid frequency. Optionally a grid transformer may be applied.

The overall aim of the invention is to apply, using the generator side converter, a well-defined load time curve to the power generator when an abnormal working situation is detected. Such abnormal working condition may involve a grid fault, a faulty grid side converter etc. The applied load time curve ensures that backlashing or other types of drive train oscillations occur during shutdown of the wind power facility are avoided.

The power dissipation means may comprise resistive means, or unit/-s, whereas the power storage means may comprise capacitive means, or unit/-s, or a battery.

It is an advantage of the present invention that it, and thereby the load time curves, may be implemented on already installed wind power facilities via modifications of the control software.

The load time curve may provide an initial generator load that depends on the generator load before determination of shutdown, i.e. before initiation of the shut down sequence. In one scenario the provided generator load may essentially equal the generator load before determination of shutdown. By matching the generator load before and after the detection of for example a grid fault an essentially bumpless transition may be ensured.

The load time curve may provide that a rotational speed dependent load is applied to the power generator during shutdown of the wind power facility.

In a first embodiment the applied load time curve may be selected among a plurality of predetermined load time curves. The plurality of predetermined load time curves may be defined and selectable from a look-up table. The predetermined load time curves may be shaped to account for various shut down profiles, such as different generator load levels, linear or non-linear load reduction over time, shut down times etc. The method according to the first embodiment may be put into action almost instantaneously when demands so require.

In a second embodiment the applied load time curve may be determined dynamically, i.e. on-the-fly, using measured parameters from one or more of the selected generator side converter components. In this embodiment an applied load time curve may reflect an actual energy capability of IGBTs and/or cooling means, or equipment, of the generator side converter. Also, the applied load time curve may reflect parameters, such as temperatures, of a DC-chopper being operatively connected to the intermediate DC circuit. Compared to the more static load time curves of the first embodiment the dynamic load time curves of the second embodiment may, more accurately, account for local fluctuations, such as temperature fluctuations.

In a second aspect the present invention relates to a wind power facility comprising a power generator, a power converter comprising generator side and grid side converters being separated by an intermediate DC circuit, power dissipation or power storage means, or equipment, being operatively connected to the intermediate DC circuit, and at least one controller, or control means, for determining that the wind power facility needs to be shut down, wherein the generator side converter is adapted to be operated in accordance with a load time curve during shutdown of the wind power facility in order to avoid overloading of selected generator side converter components and the power dissipation or power storage means.

Similar to the first aspect the selected generator side converter components may include components like the active switches, typically in the form of IGBTs, and/or the associated cooling means of the converter.

The at least one controller, e.g. one controller or a plurality of controllers, may be in the form of one unit or a plurality of units, which may be interconnected.

Again, the term wind power facility is to be understood broadly, i.e. it may cover a single wind turbine or it may cover a wind power plant comprising a plurality of wind turbines. Similarly, the power generator, the power converter and the power dissipation or power storage means, or equipment, may be implemented as disclosed above.

The load time curve generally provides that a rotational speed dependent load is applied to the power generator during shutdown whereby backlashing or other types of drive train oscillations may be avoided.

The load time curves may be predefined in one or more look-up tables.

Alternatively, means, or equipment, may be provided to determine the applied the load time curve dynamically, i.e. on-the-fly, using measured parameters from one or more of the selected generator side converter components. In this scenario an applied load time curve may reflect an actual energy capability of IGBTs and/or cooling means, or equipment, of the generator side converter. Also, the applied load time curve may reflect parameters, such as temperatures, of a DC-chopper being operationally connected to the intermediate DC circuit.

BRIEF DESCRIPTION OF THE DRAWINGS

The present invention will now be explained in further details with reference to the accompanying figures, where.

Figure 1:
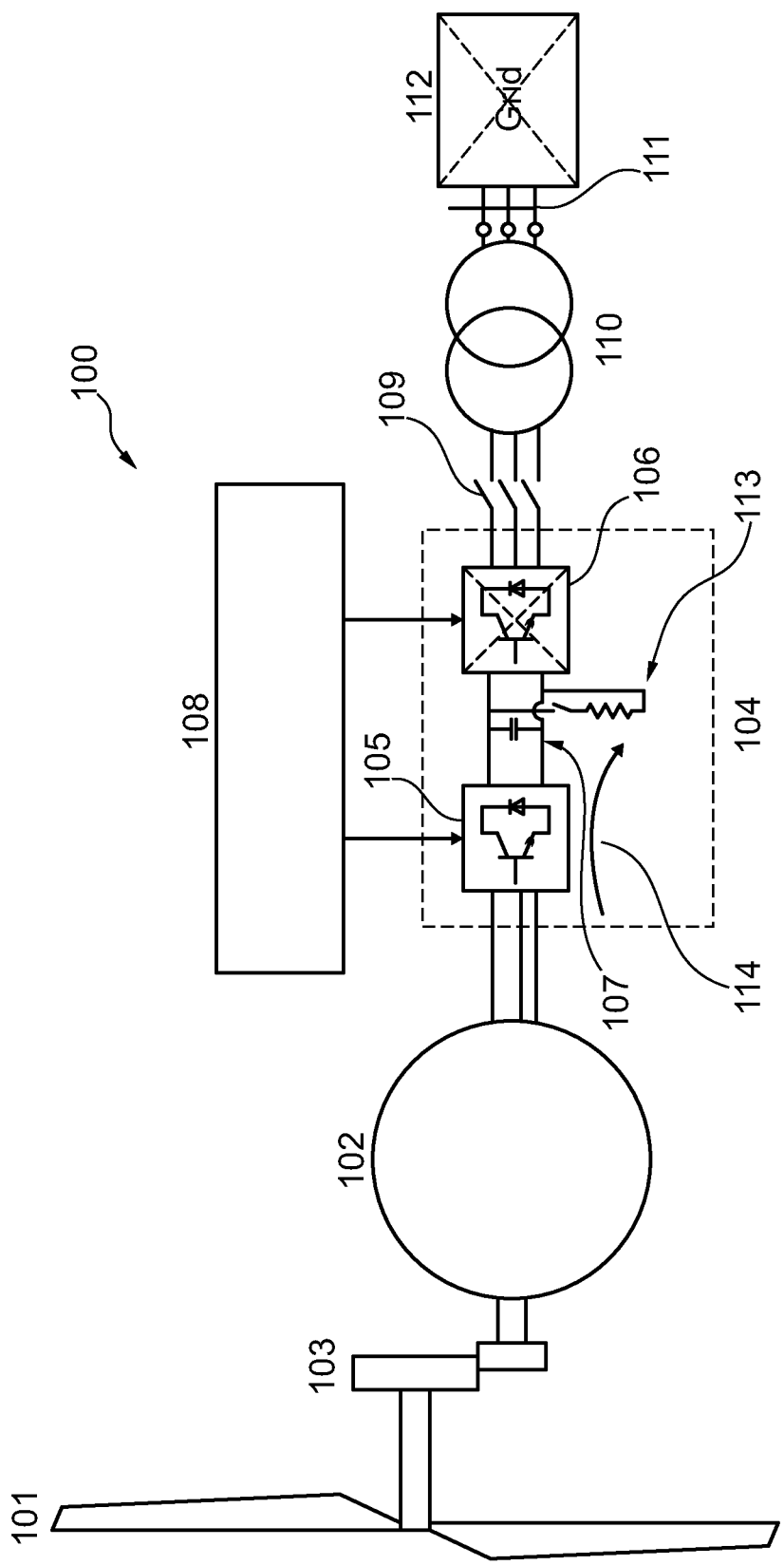
FIG. 1 shows a schematic diagram of the wind power facility.

While the invention is susceptible to various modifications and alternative forms specific embodiments have been shown by way of examples in the drawings and will be described in detail herein. It should be understood, however, that the invention is not intended to be limited to the particular forms disclosed.

DETAILED DESCRIPTION OF THE INVENTION

In its most general aspect the present invention relates to a method for shutting down a wind power facility without generating backlashing or drive train oscillations. During shutdown of the wind power facility the generated power is either dissipated and/or stored within the wind power facility without overloading a generator side converter as well as appropriate means, e.g. equipment or unit/-s, for dissipating and/or storing generated power.

Referring now to FIG. 1 a typical wind power facility 100 is depicted. As seen in FIG. 1 a set of rotor blades 101 drives a generator 102 via a gear box 103. The gear box 103 is to be considered optional. The power generated by the generator 102 is provided to a power converter 104 which comprises a generator side AC/DC converter 105 and a grid side DC/AC converter 106 separated by an intermediate DC circuit 107. A DC-chopper 113 including power dissipation and/or power storing means, e.g. equipment or unit/-s, is connected to the intermediate DC circuit 107 so that power from the generator side AC/DC converter may be dissipation and/or stored therein. A converter controller 108 controls the operation of the generator side AC/DC converter 105 and a grid side DC/AC converter 106. During normal operation the wind power facility delivers power to an associated power grid 112 via converter grid breakers 109, a grid transformer 110 and a switchgear 111.

In the scenario depicted in FIG. 1 the converter grid breakers 109 are open and the grid side DC/AC converter 106 is disabled or faulty. Thus, the wind power facility is prevented from delivering power to the power grid 112. The disabled or faulty AC/DC converter 106 and the disabled power grid 112 are illustrated by the two dashed crosses. The origin to this abnormal situation may be many, such as grid faults, a faulty grid side DC/AC converter etc.

During the above-mentioned abnormal situation the generator side AC/DC converter 105 is still being operated and thus acts as a load to the generator 102. In order to avoid backlashing and drive train oscillations the generator side AC/DC converter 105 acts as a speed dependent load during shutdown of the wind power facility 100.

As illustrated by the arrow 114 in FIG. 1 the power generated by the generator 102 is provided to the generator side AC/DC converter 105 before being dissipated and/or stored in the DC-chopper 113. To ensure that the DC-chopper 113 is not overloaded during shutdown of the wind power facility 100 the power capacity and the time constrain of the DC-chopper 113 must be complied with. Moreover, since cooling of the active switches, typically IGBTs, may be lost due to the disconnection from the power grid, strict temperature constraints are to be dealt with as well. Thus, the IGBTs and the associated cooling means of the IGBTs may be considered critical and thereby selected generator side converter components which may not be overloaded.

The load provided to the generator during shutdown follows a so-called load time curve. Load time curves may be configurable, being of different shapes, originate from look-up tables or being an output from a polynomial equation to cope with the overall capability of power converter 104, including IGBTs, DC-chopper, cooling etc.

Load time curves can also be made more intelligently, for example by dynamically adjusting a reference based on energy estimators of the DC-chopper or other lower capability components within the power converter 104.

Figure 2:
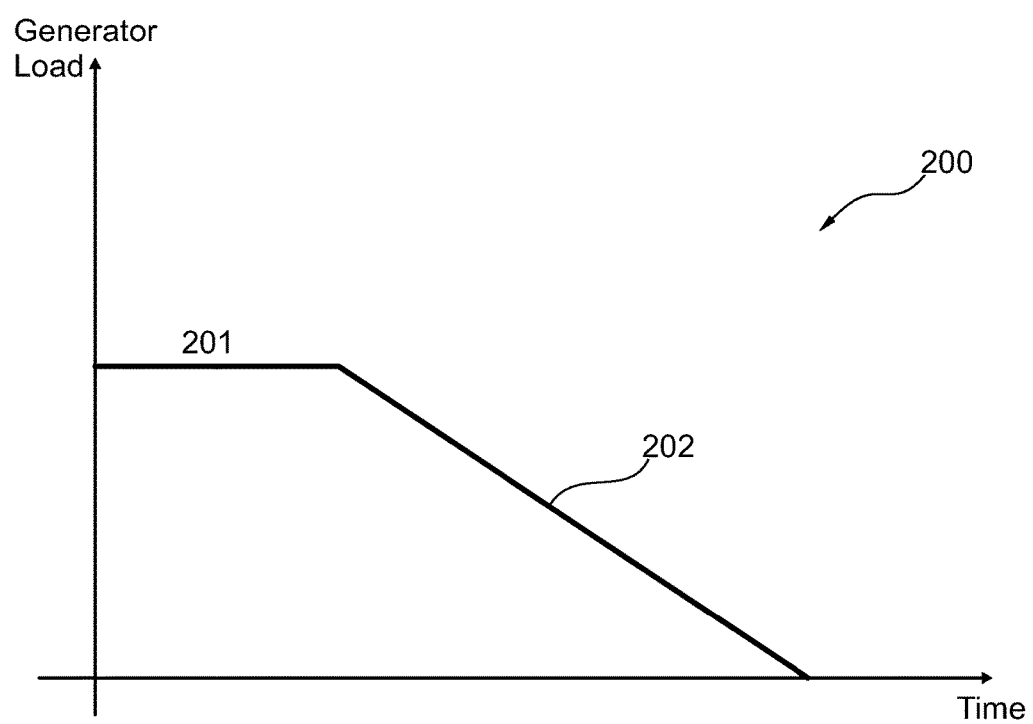
FIG. 2 shows a first load time curve.

An example of a load time curve 200 is shown in FIG. 2. As seen the load time curve has a flat region 201 corresponding to the rated power level of the wind power facility. After a predetermined period of time the load applied to the generator starts to decrease linearly 202 until it reaches zero and the wind power facility has stopped. Thus, the load applied to the wind power facility depends of the speed of the generator of the wind power facility in that a high rotational speed of the generator requires a high load to be applied to the generator.

Figure 3:
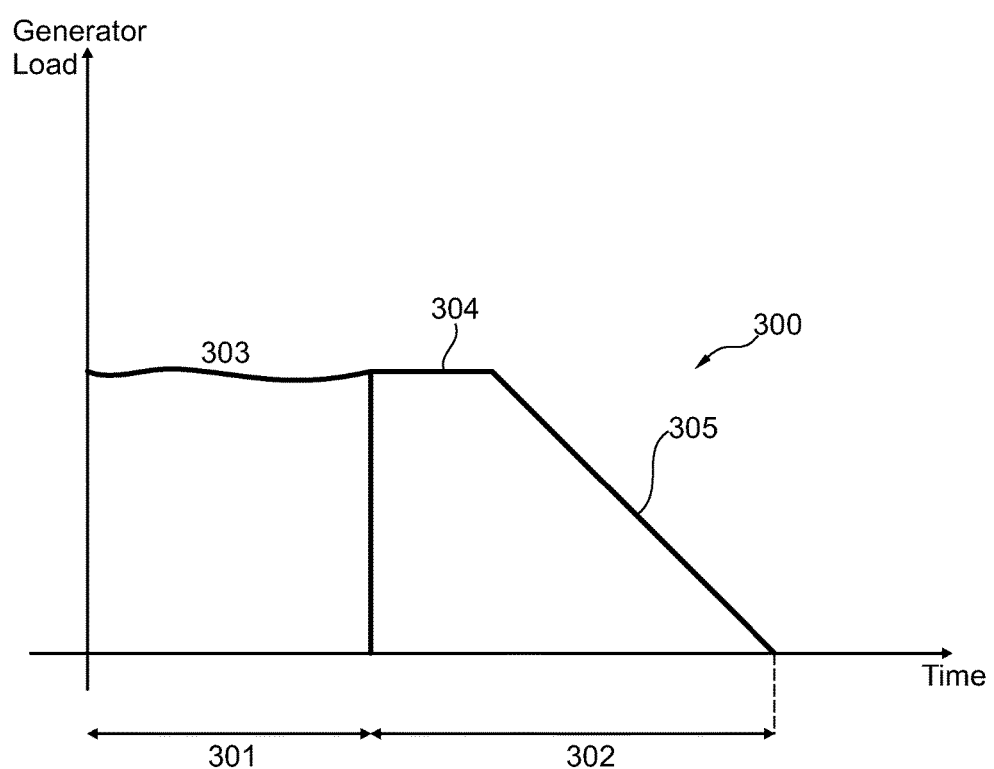
FIG. 3 shows a second load time curve.

FIG. 3 shows a load time curve 300 similar to the one of FIG. 2 applied in a wind turbine shut down sequence. FIG. 3 illustrates in time window 301 that the wind power facility is operated normally at or near a rated power level. During this time window 301 the load applied to the generator is illustrated by line 303. At the end of time window 301 an abnormal working condition is detected and the load time curve 304, 305 is applied to the generator during time window 302.

Figure 4:
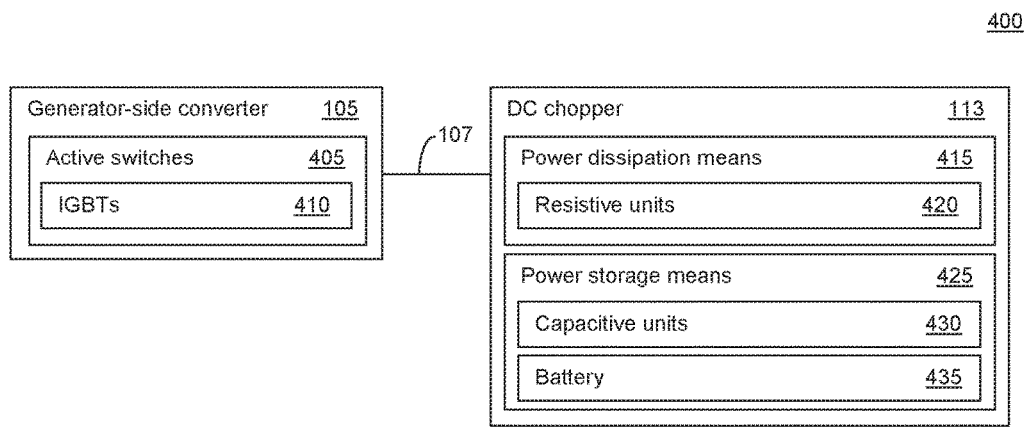
FIG. 4 shows a generator-side converter and a DC chopper of a power converter.

FIG. 4 is a diagram 400 showing the generator-side converter 105 connected to the DC chopper 113 via the intermediate DC circuit 107. The generator-side converter 105 comprises active switches 405, which may be IGBTs 410. The DC chopper 113 comprises one or more of: power dissipation means 415 and power storage means 425. The power dissipation means 415 comprises one or more resistive units 420. The power storage means 425 comprises one or more of: one or more capacitive units 430 and a battery 435.

What is claimed is:

1. A method for shutting down a wind power facility, said wind power facility comprising a power generator, a power converter comprising a generator-side converter and a grid-side converter being separated by an intermediate direct current (DC) circuit, and a DC chopper operatively connected to the intermediate DC circuit, the method comprising:
    determining, using a controller communicatively coupled with the power converter, to preform a shutdown of the wind power facility;
    applying a first load-time curve for operating the generator-side converter during the shutdown without overloading the DC chopper, wherein the first load-time curve is selected based in part on a temperature of an insulated-gate bipolar transistor (IGBT) of the power converter;
    adapting the first load-time curve to a second load-time curve in response to fluctuations of the temperature; and
    operating the generator-side converter in accordance with the adapted first load-time curve during the shutdown of the wind power facility.

2. The method according to claim 1, wherein the first load-time curve specifies an initial generator load that depends on a load of the power generator prior to determining to perform the shutdown.

3. The method according to claim 1, wherein the first load-time curve specifies a rotational speed-dependent load that is applied to the power generator during the shutdown.

4. The method according to claim 1, wherein the first load-time curve is selected from a plurality of predetermined load-time curves.

5. The method according to claim 4, wherein the plurality of predetermined load-time curves is selected from a look-up table.

6. The method according to claim 4, wherein the first load-time curve is selected from the plurality of load-time curves based on one or more measured parameters that reflect an actual energy capability of insulated-gate bipolar transistors (IGBTs) of the generator-side converter.

7. The method of claim 1, wherein the first load-time curve is selected based in additional part on a temperature of the DC chopper.

8. The method of claim 1, wherein the DC chopper comprises one or more of: power dissipation means and power storage means.

9. The method of claim 8, wherein the power dissipation means comprises one or more resistive units.

10. The method of claim 8, wherein the power storage means comprises one or more of: capacitive units and a battery.

11. The method of claim 1, wherein the first load-time curve is selected based on one or more shutdown profiles specifying one or more of:
    a load level of the power generator;
    a linear or a non-linear reduction of the load level over time; and
    a shutdown time.

12. The method of claim 1, wherein the first load-time curve is output from a predefined polynomial equation based on a capacity of the power converter as input.

13. A wind power facility comprising:
    a power generator;
    a power converter comprising a generator-side converter and a grid-side converter that are separated by an intermediate direct current (DC) circuit;
    a DC chopper operatively connected to the intermediate DC circuit; and
    at least one controller configured to:
        determine to perform a shutdown of the wind power facility;
        apply a first load-time curve for operating the generator-side converter during the shutdown without overloading the DC chopper, wherein the first load-time curve is selected based in part on a temperature of an insulated-gate bipolar transistor (IGBT) of the power converter;
        adapt the first load-time curve to a second load-time curve in response to fluctuations of the temperature; and
        operate the generator-side converter in accordance with the first load-time curve as adapted during the shutdown of the wind power facility.

14. The wind power facility according to claim 13, wherein the first load-time curve specifies a rotational speed-dependent load that is applied to the power generator during the shutdown.

15. The wind power facility according to claim 13, wherein the first load-time curve is defined in a look-up table.

16. The wind power facility according to claim 13, wherein first load-time curve is selected from a plurality of load-time curves based on one or more measured parameters that reflect an actual energy capability of insulated-gate bipolar transistors (IGBTs) of the generator-side converter.

* * * * *